United States Patent
Kotzer et al.

(10) Patent No.: US 11,956,026 B2
(45) Date of Patent: Apr. 9, 2024

(54) SYSTEM AND METHOD FOR POWER LINE COMMUNICATION (PLC) AND DATA FLOW CONTROL

(71) Applicant: GM GLOBAL TECHNOLOGY OPERATIONS LLC, Detroit, MI (US)

(72) Inventors: Igal Kotzer, Tel Aviv (IL); Shlomo Malka, Ra'anana (IL); Ayelet Aharon, Rishon Lezyon (IL)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 17/739,573

(22) Filed: May 9, 2022

(65) Prior Publication Data

US 2023/0361810 A1    Nov. 9, 2023

(51) Int. Cl.
*H04B 3/54*    (2006.01)
*H04B 3/04*    (2006.01)

(52) U.S. Cl.
CPC ............. *H04B 3/54* (2013.01); *H04B 3/04* (2013.01)

(58) Field of Classification Search
CPC ... H04B 3/04; H04B 3/54; H04B 1/00; H04B 3/00
See application file for complete search history.

(56) References Cited

U.S. PATENT DOCUMENTS

| | | | |
|---|---|---|---|
| 8,653,952 B2 | 2/2014 | Abe et al. | |
| 2006/0023734 A1* | 2/2006 | Yanagida | H04B 3/548 370/438 |
| 2008/0297258 A1 | 12/2008 | Naito et al. | |
| 2010/0111201 A1 | 5/2010 | Sakai et al. | |
| 2011/0245989 A1* | 10/2011 | Makhota | G05B 15/02 700/297 |
| 2012/0274278 A1 | 11/2012 | Igata | |
| 2013/0321134 A1 | 12/2013 | Frye et al. | |
| 2013/0342008 A1 | 12/2013 | Takata et al. | |
| 2017/0302250 A1 | 10/2017 | Costa et al. | |
| 2020/0324719 A1 | 10/2020 | Mahmoud et al. | |

* cited by examiner

*Primary Examiner* — David S Huang
(74) *Attorney, Agent, or Firm* — Quinn IP Law

(57) ABSTRACT

A power line communication (PLC) system for a vehicle is contemplated. The system may include a plurality of power lines configured to connect at least a first node and a second node to negative and positive terminals of a vehicle battery. The system may include a filter connected to the power lines. The filter may be configured to attract a first portion of a PLC signal to the negative terminal prior to the first portion reaching the second node and to permit a second portion of the PLC signal to continue transmission to the second node.

17 Claims, 3 Drawing Sheets

SYSTEM AND METHOD FOR POWER LINE COMMUNICATION (PLC) AND DATA FLOW CONTROL

INTRODUCTION

The present disclosure relates to power line communication (PLC), such as but not necessarily limited to PLC of the type suitable for use in facilitating data transmission over power lines included within a vehicle.

Vehicles include a vast number of onboard, electronic devices, controllers, modules, units, nodes, subsystems, and the like, which may be referred to as components. The components may be dependent on electrical energy distributed through a power distribution system onboard the vehicle, such as a distribution system having a plurality of power lines configured to electrically connect the components to a vehicle battery. The components may also be dependent on a communication network to exchange information with other components, such as a communication network having on a plurality of communication lines configured to electrically connect the components to each other. The vehicle, accordingly, includes a significant quantity of power and communication lines, which typically necessitates complex and costly manufacturing to package and install the lines between door panels, flooring, and other hard-to-reach places within the vehicle, and also increases individual component costs and overall vehicle weight.

SUMMARY

Disclosed herein is a power line communication (PLC) system configured for mitigating the amount of cabling, wiring, fiber, and/or other physical media included in a vehicle or other device. The PLC system contemplates utilizing power lines to provide network communications between vehicle components in a manner that enables some of the cabling previously dedicated solely for network communications to be eliminated, i.e., to enable the power lines to exchange data between vehicle components in place of separate communication lines.

The PLC system relies upon a filter to influence PLC signals modulated or otherwise imparted for transmission over the power lines, i.e., PLC signals used for purposes of facilitating PLC of data, information, instructions, commands, etc. between vehicle components. The filter, for instance, may act on or otherwise arbitrate the PLC signals in a manner sufficient to enable data transmissions to be selectively performed between multiple vehicle components.

One non-limiting aspect of the present disclosure relates to a power line communication (PLC) system for a vehicle. The system may include a plurality of power lines configured to connect at least a first node and a second node to negative and positive terminals of a vehicle battery. The system may further include a filter connected to the power lines configured to attract a first portion of a PLC signal to the negative terminal prior to reaching the second node the first node and pass a second portion of the PLC signal to the power lines for continue transmission to the second node.

The first portion may correspond with portions of the PLC signal within one or more frequency bands and the second portion corresponding with portions of the signal outside the frequency bands.

The filter may be configured to selectively set an impedance dictating a capability of the filter to attract the first portion and to pass the second portion.

The filter may be configured to determine the impedance and/or the frequency bands from information provided over the power lines by one of the first and second nodes.

The filter may be configured to adjust the impedance, and thereby the frequency bands of the PLC signal attracted to the filter, in response to additional information provided over the power lines by one of the nodes.

The filter may be configured to set a low value for the impedance associated with the first portion and to set a high value for the impedance associated with the second portion.

The filter may be configured to connect in parallel with the first and second nodes to the power lines.

The filter may include first, second, third, and fourth jumpers configured to connect the filter to the power lines wither the first and third jumpers configured to connect to the positive terminal and the second and fourth jumpers configured to connect to the negative terminal. The filter may be configured to attract the first portion from the first jumper to the second jumper and to pass the second portion from the first jumper to the third jumper.

The jumpers may be configured to clip to the power lines without severing electrical continuity of the power lines.

The filter may be configured to connect to the power lines independently of the first and second nodes.

The filter may be configured to connect to the power lines within an enclosure of one of the first and second nodes.

The filter may be configured to connect to the power lines such that the first and second nodes continue to receive electrical energy from the battery when the filter experiences an open-circuit condition.

The battery may be a non-traction battery independent of a traction battery configured to power an electric motor of the vehicle.

The first and second nodes may be electronic control units (ECUs) onboard the vehicle with the ECUs operating independently and being connected to the power lines at distinct locations.

The nodes may be networks and/or subsystems onboard the vehicle, the networks and/or subsystems being gateways to additional nodes, modules, units and/or devices connected downstream therefrom.

One non-limiting aspect of the present disclosure relates to power line communication (PLC) system for a vehicle. The system may include a plurality of nodes configured to perform a function associated with operating the vehicle where the function may be dependent on at least a first node of the nodes transmitting a PLC signal over a plurality of power lines to a second node of the nodes with the power lines optionally being included to connect the nodes with a non-traction battery of the vehicle. The system may further include a filter configured to attract a first portion of the PLC signal to a ground of the vehicle prior to the first portion reaching the second node and avoid attracting a second portion of the signal to the ground such that the second portion is thereafter free to traverse the power lines to the second node.

The first portion may correspond with portions of the signal within one or more frequency bands and the second portion corresponds with portions of the signal outside the frequency bands. The filter may be configured to set an impedance of the filter to a low value for the impedance associated with the first portion and to a high value for the impedance associated with the second portion whereby the filter determines the impedance from information provided over the power lines by one of the nodes.

One non-limiting aspect of the present disclosure relates to a method for power line communication (PLC) within a vehicle. The method may include receiving instructions at a filter onboard the vehicle whereby the instructions may be communicated over power lines included within the vehicle to connect a plurality of nodes to a battery and whereby the nodes may be configured to exchange PLC signals over the power lines. The method may further include adjusting an impedance of the filter from a first set of values to a second set of values in response to the instructions, the first set of values causing the filter to attract portions of the PLC signals within a first group of frequencies to a ground of the vehicle, the second set of values causing the filter to attract portions of the PLC signals within a second group of frequencies to the ground, the second group including one or more frequencies outside of the first group.

The method may include, when operating according to the first set, directing portions of the PLC signals within the first group to the ground before reaching a destination associated therewith and without grounding other portions of the PLC signals outside the first group, and when operating according to the second set, directing portions of the PLC signals within the second group to the ground before reaching a destination associated therewith and without grounding other portions of the PLC signals outside the second group.

The method may include the filter being configured to include first and second jumpers on one side and third and fourth jumpers on another side with the first and third jumpers connecting to negative lines of the power lines. The method may further include directing the portions of the PLC signals to ground via the first and second jumpers.

The above features and advantages, and other features and attendant advantages of this disclosure, will be readily apparent from the following detailed description of illustrative examples and modes for carrying out the present disclosure when taken in context with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The above features and advantages and other features and advantages of the present teachings are readily apparent from the following detailed description of the modes for carrying out the present teachings when taken in connection with the accompanying drawings. It should be understood that even though in the following Figures embodiments may be separately described, single features thereof may be combined to additional embodiments.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
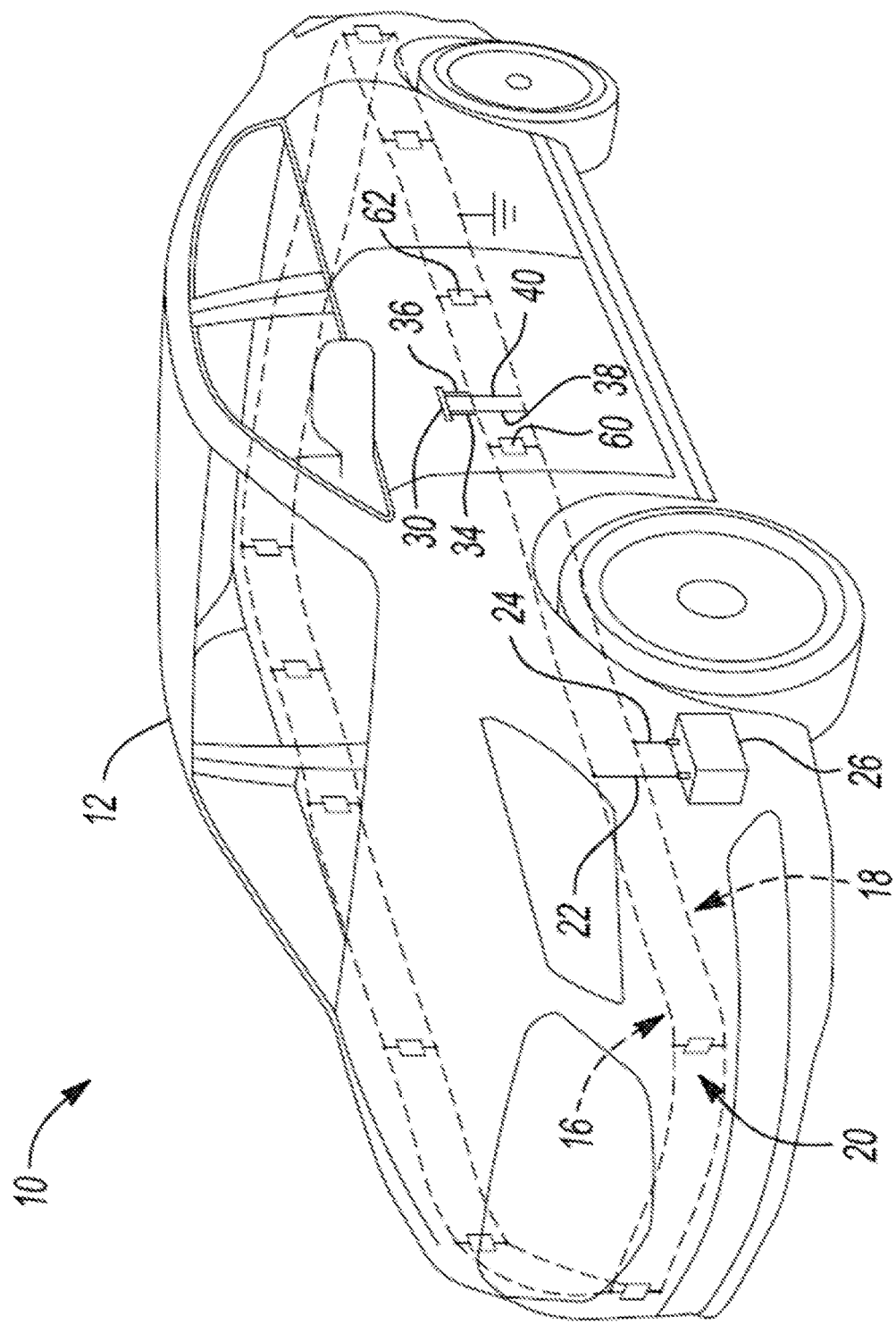
FIG. 1 illustrates a power line communication (PLC) system in accordance with one non-limiting aspect of the present disclosure.

FIG. 1 illustrates a power line communication (PLC) system 10 in accordance with one non-limiting aspect of the present disclosure. The PLC system 10 is predominately described with respect to facilitating PLC-dependent communications within a vehicle 12 to demonstrate beneficial capabilities of the present disclosure to ameliorate the quantity and the duplicate use of cabling, wiring, fiber, and/or other physical media. The vehicle 12 is illustrated as an automobile due to automobiles typically having a vast number of onboard, electronic devices, controllers, modules, units, subsystems, etc. requiring physical media to support communications and powering. This is done for exemplary non-limiting purposes as the present disclosure fully contemplates its use and application with other types of vehicles, such as vessels, heavy equipment units, etc., and/or in other non-vehicle environments where it may also be beneficial to mitigate the quantity of physical media and/or where it may be beneficial to mitigate the use of separate physical media to provide separate power and communication connections between the same nodes.

The PLC system 10 is shown to include a plurality of power lines 16, 18 configured to electrically and communicatively connect a plurality of nodes 20 in parallel with positive and negative terminals 22, 24 of a battery 26. The nodes 20 are contemplated to include various types of standalone components, such as but not necessarily limited to electronic control units (ECUs), modules, devices, etc., as well as gateways or interfaces between subsystems or other networks, e.g., some vehicles include independent networks or subsystems interconnected with each other through gateways. The nodes 20 may be considered as endpoints, stations, or other constructs configured to operate in response to data communicated thereto and/or to generate data for communication to other nodes 20. The nodes 20 may operate in cooperation with additional nodes or other devices within the vehicle incapable of receiving or processing power and/or data communicated over the power lines 16, 18, e.g., additional nodes may be connected to the power line 16, 18 and/or otherwise in communication with the nodes 20.

The nodes 20 are shown to be connected in parallel to the battery 26 for purposes of establishing electrical connections needed for powering. The battery 26 may be a lower-voltage or non-traction type of battery, e.g., 12-40 VDC, configured to facilitate secondary or auxiliary powering separately from a high-voltage type of battery 26 onboard the vehicle 12 to power an electric, traction motor (not shown). The battery 26 is described for exemplary non-limiting purposes as being of the type typically employed within automobiles to power various vehicle systems and components as the present disclosure fully contemplates its use and application with batteries having higher or lower voltages. The exemplary illustration is believed to be particularly beneficial as the nodes 20 relying upon 12-40 VDC typically require more robust or larger gauge cabling, wiring, etc. than lower voltage nodes (not shown), and as such, are believed benefit even more from the improved power and communication functionality of the present disclosure. The present disclosure, nonetheless, fully contemplates its use and application with lower voltage batteries and/or nodes.

The system 10 is shown to include a filter 30 configured to provide PLC and data flow in accordance with one non-limiting aspect of the present disclosure. The filter 30 may be configured, like the nodes 20, to electrically and communicatively connect in parallel with the positive and negative terminals 22, 24 of the battery 26 via the power lines 16, 18. The filter 30 may include a plurality of jumpers 34, 36, 38, 40 configured to establish connections with the power lines 16, 18. The jumpers 34, 36, 38, 40 may be wires having clips, traces included as part of a printed circuit board (PCB), interfaces, receptacles, or other features capable of electrically connecting the filter 30 with the power lines 16, 18. This connection of the filter 30 to the power line 16, 18 may be beneficial in enabling power to flow between the nodes should the filter 30 experience an open circuit condition, and/or to enable the filter 30 to be connected without disrupting the power flow. The filter 30 is shown to be a standalone controller independent of the nodes 20 and separately connected to the power line 16, 18 for exemplary non-limiting purposes as the present disclosure fully contemplates the filter being included as part of or enclosed within one or more of the nodes 20.

Figure 2:
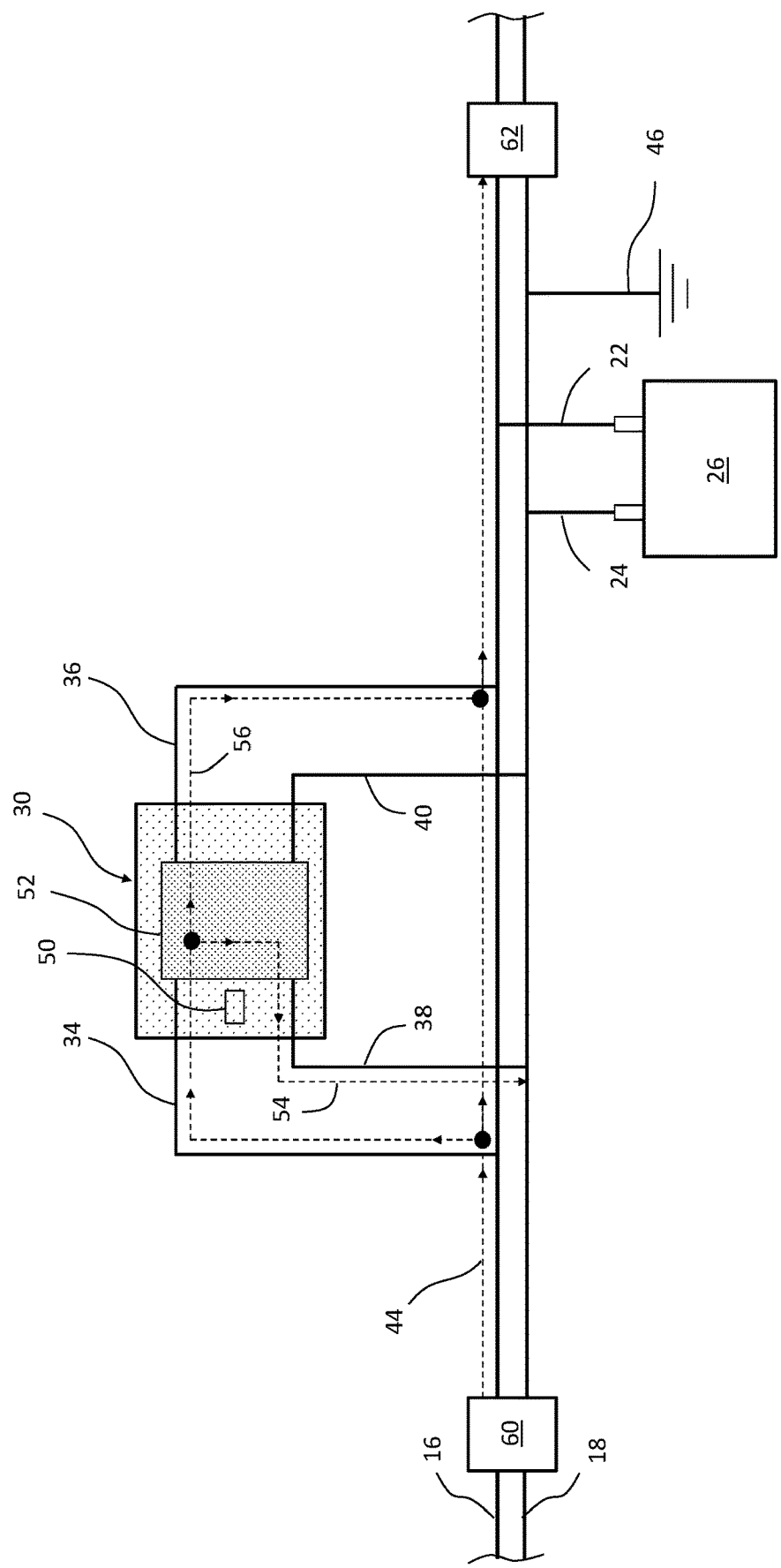
FIG. 2 illustrates a schematic view of a filter in accordance with one non-limiting aspect of the present disclosure.

FIG. 2 illustrates a schematic view of the filter 30 in accordance with one non-limiting aspect of the present disclosure. The filter 30 may be configured to selectively attract portions of signaling 44 traveling over the power lines 16 to the negative terminal 24 and/or a ground 46 (chassis, etc.) of the vehicle 12 before an entirety of the signal 44 reaches an intended destination. The filter 30 may include a controller 50, an impedance reduction component 52, and/or other componentry to facilitate the operations contemplated herein. One non-limiting aspect of the present disclosure contemplates the controller 50 including a processor and a computer readable storage medium having a plurality of non-transitory instructions, which when executed with the processor, are sufficient to facilitate controlling the filter 30 to support the PLC. The impedance reduction component 52 and/or the other components of the filter 30 may be adjustably controlled with the controller 50 to selectively filter one or more portions of the signal 44.

The filter 30 is shown for exemplary purposes with respect to filtering the signal 44 received at the first jumper 34 such that a first portion of the signal 44 is attracted to the third jumper 38 and thereafter towards the negative terminal 24 and/or the ground 46 and a second portion 56 of the signal 44, i.e., the remaining portion unattracted to the third jumper 38, is passed to the second jumper 36 and thereafter for continued transmission over the power line 16. The signal 44 may be a data signal or other type of signal intended to be transmitted from a first node 60 to a second node 62 of the plurality of nodes 20 as if the nodes 60, 62 were communicating over a communication network. Rather than communicating over an independent communication network, the present disclosure enables similar types of communications to be carried over the power lines 16, 18, i.e., as part of a power distribution network, such that the power line 16 is used to communicate power and data between the nodes 20. The ability to communicate both power and data over the same power lines 16, 18 may be beneficial in limiting the amount of physical media included with the vehicle 12 through the elimination of physical media used solely for data transmission.

One non-limiting aspect of the present disclosure contemplates the filter being configured to provide data flow control over the power line 16, 18. FIGS. 1-2 illustrate a single filter 30 for illustrative purposes as multiple filters 30 may be included within the system 10, optionally with one filter 30 connected in parallel between each adjoining node 20 and/or one filter 30 included as part of or connected to each of the nodes 20. The additional filters 30 may be selectively controlled to attract and pass differing portions of the signal 44 (e.g., filtering in the frequency domain) such that each filter 30 may selectively control the signaling passing therethrough. The nodes 20 may be configured to transmit the signal 44 with headers, addresses, and/or other information usable with the controller 50 to selectively identify the portions of the signal 44 to be directed to the second and third jumpers 36, 38. Another filter (not shown) downstream of the second node 62, for example, may be instructed to attract a portion of the second portion/signal 56 and to pass the remaining portion onto another downstream node (not shown) such that individual portions of the original signal 44 are separately attracted to ground 46 before traveling further, thereby providing data flow control.

Figure 3:
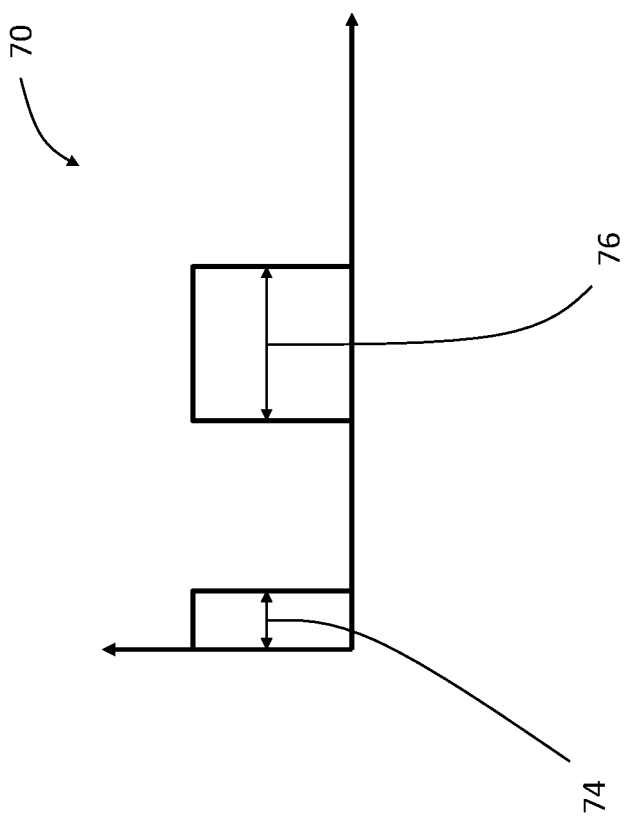
FIG. 3 illustrates a diagrammatical view of a data flow control diagram in accordance with one non-limiting aspect of the present disclosure.

FIG. 3 illustrates a diagrammatical view of a data flow control diagram 70 in accordance with one non-limiting aspect of the present disclosure. The impedance reduction component 52 and/or the other components of the filter 30 may cooperate to provide signal processing sufficient to control the filter 30 according to the filtering illustrated in the diagram 70. The diagram 70 includes power (P[W]) represented on a vertical access and frequency (f [Hz]) represented on a horizontal axis to illustrate the filter 30 being operable to pass a portion of signal corresponding within a first frequency band 74 (e.g., $0-f_0$) and a second frequency band 76 (e.g., $f_1-f_2$). The first frequency band 74 may be reserved for a control signal to facilitate the nodes 20 including instructions to be used for data flow control of downstream filters 30. The second frequency band 76 may be associated with a particular portion of the signal 44 to be passed such that everything but the portions of the signal 44 coinciding with the frequency bands 74, 76 are attracted to the negative terminal/ground 24, 46.

Figure 4:
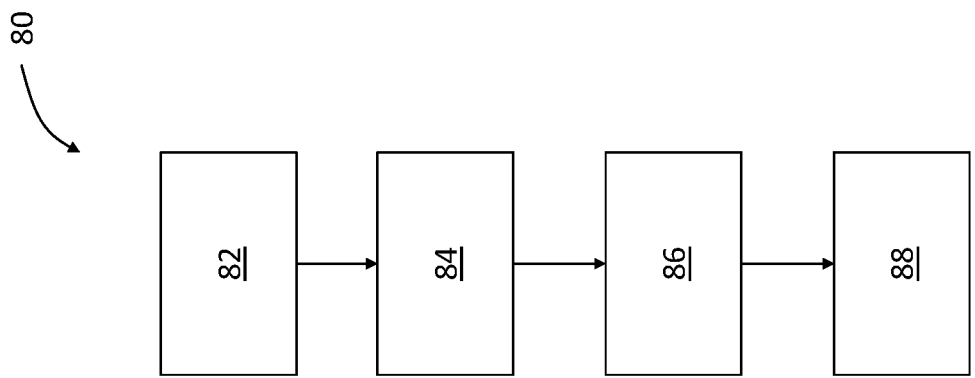
FIG. 4 illustrates a schematic overview of a flowchart for PLC in accordance with one non-limiting aspect of the present disclosure.

FIG. 4 illustrates a schematic overview of a flowchart 80 for PLC in accordance with one non-limiting aspect of the present disclosure. Block 82 relates to the first node 60 originating the signal 44 with control information within the first frequency band 74 and data desired for receipt at the second node 62 within the second frequency band 76. Block 84 relates to a first filter 30 processing the control information to identify the portions of the signal 44 to be attracted through the third jumper 38, i.e., the signal portion 54 outside of the first and second frequency bands 74, 76, and the portions of the signal 44 to be passed through to the second jumper 36 for subsequent transmission to the second node 62, i.e., the signal portion 56 within the first and second frequency bands 74, 76. Block 86 relates to the second node 62 processing the signal 54, such as to perform a vehicle function or otherwise facilitate operation of the vehicle 12 according to instructions therein. Block 88 relates to a second filter (not shown) downstream of the second node 62 processing the control information to determine the second portion 54 having reached its destination, i.e., the second node 62, and responsively attracting the second portion 54 to the ground 46 before continuing further over the power lines 16, 18.

The disclosure may be embodied in many different forms. Representative examples are shown in the various drawings and described herein in detail as non-limiting representations of the disclosed principles. To that end, elements and limitations described above, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the disclosure, as defined by the claims. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed:

1. A power line communication (PLC) system for a vehicle, the system comprising:
   a plurality of power lines configured to connect at least a first node and a second node to negative and positive terminals of a vehicle battery; and
   a filter connected to the power lines, the filter being configured to:
      attract a first portion of a PLC signal to the negative terminal prior to reaching the second node, the PLC signal being output to the power lines from the first node; and
      pass a second portion of the PLC signal to the power lines for continued transmission to the second node
   wherein the filter is configured to connect in parallel with the first and second nodes to the power lines; and
   wherein:
      the filter includes first, second, third, and fourth jumpers configured to connect the filter to the power lines, the first and third jumpers being configured to connect to the positive terminal, the second and fourth jumpers being configured to connect to the negative terminal; and
      the filter is configured to attract the first portion from the first jumper to the second jumper and to pass the second portion from the first jumper to the third jumper.

2. The system according to claim 1 wherein the first portion corresponds with portions of the PLC signal within one or more frequency bands and the second portion corresponds with portions of the PLC signal outside the frequency bands.

3. The system according to claim 2 wherein the filter is configured to selectively set an impedance, the impedance dictating a capability of the filter to attract the first portion and to pass the second portion.

4. The system according to claim 3 wherein the filter is configured to determine the impedance and/or the frequency bands from information provided over the power lines by one of the first and second nodes.

5. The system according to claim 4 wherein the filter is configured to adjust the impedance, and thereby the frequency bands of the PLC signal attracted to the filter, in response to additional information provided over the power lines by one of the first and second nodes.

6. The system according to claim 3 wherein the filter is configured to set a low value for the impedance associated with the first portion and to set a high value for the impedance associated with the second portion.

7. The system according to claim 1 wherein the jumpers are configured to clip to the power lines without severing electrical continuity of the power lines.

8. The system according to claim 1 wherein the filter is configured to connect to the power lines independently of the first and second nodes.

9. The system according to claim 1 wherein the filter is configured to connect to the power lines within an enclosure of one of the first and second nodes.

10. The system according to claim 1 wherein the filter is configured to connect to the power lines such that the first and second nodes continue to receive electrical energy from the battery when the filter experiences an open-circuit condition.

11. The system according to claim 10 wherein the battery is a non-traction battery independent of a traction battery configured to power an electric motor of the vehicle.

12. The system according to claim 1 wherein the first and second nodes are electronic control units (ECUs) onboard the vehicle, the ECUs operating independently and being connected to the power lines at distinct locations.

13. The system according to claim 1 wherein the nodes are networks and/or subsystems onboard the vehicle, the networks and/or subsystems being gateways to additional nodes, modules, units and/or devices connected downstream therefrom.

14. A power line communication (PLC) system for a vehicle, the system comprising:
a plurality of nodes configured to perform a function associated with operating the vehicle, the function being dependent on at least a first node of the nodes transmitting a PLC signal over a plurality of power lines to a second node of the nodes, the power lines being included to connect the nodes with a non-traction battery of the vehicle; and
a filter configured to:
attract a first portion of the PLC signal to a ground of the vehicle prior to the first portion reaching the second node, and
avoid attracting a second portion of the PLC signal to the ground such that the second portion is thereafter free to traverse the power lines to the second node
wherein:
the first portion corresponds with portions of the PLC signal within one or more frequency bands and the second portion corresponds with portions of the signal outside the frequency bands; and
the filter is configured to set an impedance of the filter to a low value for the impedance associated with the first portion and to a high value for the impedance associated with the second portion, the filter determining the impedance from information provided over the power lines by one of the nodes.

15. A method for power line communication (PLC) within a vehicle, the method comprising:
receiving instructions at a filter onboard the vehicle, the instructions being communicated over power lines included within the vehicle to connect a plurality of nodes to a battery, the nodes being configured to exchange PLC signals over the power lines; and
adjusting an impedance of the filter from a first set of values to a second set of values in response to the instructions, the first set of values causing the filter to attract portions of the PLC signals within a first group of frequencies to a ground of the vehicle, the second set of values causing the filter to attract portions of the PLC signals within a second group of frequencies to the ground, the second group including one or more frequencies outside of the first group.

16. The method according to claim 15 further comprising:
when operating according to the first set, directing portions of the PLC signals within the first group to the ground before reaching a destination associated therewith and without grounding other portions of the PLC signals outside the first group; and
when operating according to the second set, directing portions of the PLC signals within the second group to the ground before reaching a destination associated therewith and without grounding other portions of the PLC signals outside the second group.

17. The method according to claim 15 further comprising:
the filter being configured to include first and second jumpers on one side and third and fourth jumpers on another side, the first and third jumpers to negative lines of the power lines; and
directing the portions of the PLC signals to ground via the first and second jumpers.

* * * * *